United States Patent
Nastacio et al.

(10) Patent No.: US 8,010,528 B2
(45) Date of Patent: Aug. 30, 2011

(54) PROBLEM ISOLATION THROUGH WEIGHTED SEARCH OF KNOWLEDGE BASES

(75) Inventors: Denilson Nastacio, Apex, NC (US);
Richard Trotter, Cary, NC (US);
Michael L. Wamboldt, Garner, NC (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 12/041,520

(22) Filed: Mar. 3, 2008

(65) Prior Publication Data

US 2009/0222436 A1 Sep. 3, 2009

(51) Int. Cl.
*G06F 7/00* (2006.01)
*G06F 17/30* (2006.01)

(52) U.S. Cl. ......................................... 707/728

(58) Field of Classification Search .............. 707/3, 706, 707/722, 999.003
See application file for complete search history.

(56) References Cited

U.S. PATENT DOCUMENTS

| | | | | |
|---|---|---|---|---|
| 5,444,823 | A * | 8/1995 | Nguyen | 706/54 |
| 5,661,668 | A * | 8/1997 | Yemini et al. | 702/186 |
| 5,953,718 | A * | 9/1999 | Wical | 1/1 |
| 6,321,192 | B1 * | 11/2001 | Houchin et al. | 704/9 |

* cited by examiner

*Primary Examiner* — Mohammad Ali
*Assistant Examiner* — Alexey Shmatov
(74) *Attorney, Agent, or Firm* — Steven L. Nichols; VanCott, Bagley, Cornwall & McCarthy P.C.

(57) ABSTRACT

A computer program product for problem isolation through a weighted search of knowledge bases includes computer useable program code that generates an aggregate relevance index which ranks the search results. The aggregate relevance index is calculated using a measure of relevance of each of said pertinent documents across all keyword searches. A method for problem isolation through the weighted search of knowledge bases comprises searching knowledge bases using extracted keywords to identify pertinent documents contained within said knowledge databases; and generating a global rank associated with each of the pertinent documents, the global rank being calculated using a measure of the relevance of each of the pertinent documents across all keyword searches and a measure of the relevance of each of the keywords to the records as a whole.

11 Claims, 2 Drawing Sheets

PROBLEM ISOLATION THROUGH WEIGHTED SEARCH OF KNOWLEDGE BASES

BACKGROUND OF THE INVENTION

In general, the present invention provides a method for matching problems occurring in computer systems or networks with possible solutions contained in knowledge bases. When a computer system encounters an unrecoverable error or other technical problem, the computer system may extract information relating to the technical problem from the runtime stack, the exception stack, error stack, or other location. This extracted information is recorded in log or trace files. The information contained in the log or trace files can be helpful in determining the cause of the technical problem and in matching the technical problem to a potential solution.

Sifting through the log or trace files is often difficult because there may be hundreds of files related to a single problem. The log or trace files may contain multiple entries that indicate abnormal actions or other symptoms of the underlying technical problem. Ordinarily, these symptoms are identified, extracted from the log or trace files, and organized into a set of rules that define the symptoms. The rules are then compared to various databases in an attempt to identify the underlying technical problem and find a solution to that problem.

A technote is a typical format for recording and archiving technical problems/solutions that have been previously encountered by the technical community. In the specification and appended claims the term "technote" is used to identify any technical support document. A technote may take a variety of forms and may be served to customers using a range of media. By way of example and not limitation, technotes may be embodied in media such as printed documentation, emails, wiki entries, web pages, or internal archives.

Ordinarily, a technote contains a brief description of the symptoms of a specific technical problem and a detailed solution to that problem. However, even with the use of software tools, it is difficult to match the rules that define the symptoms of the technical problem with the appropriate technote or technotes. The software tool may produce hundreds of matches to various technotes, many of which are repeated. The user is generally forced to search through multiple technotes and decide how well the symptom descriptions within the technotes apply to the current situation. After determining the relevance of the results, the user refines the rule set to eliminate superfluous results, and repeats the search. This process is repeated until a potential solution is eventually identified.

BRIEF SUMMARY OF THE INVENTION

A computer program product for problem isolation through the weighted search of knowledge bases includes computer usable program code that extracts keywords from files related to a technical problem within a computer system, searches knowledge bases using these keywords to identify pertinent documents, and displays the pertinent documents according to a global rank which reflects the relevance of the pertinent document to the technical problem as a whole.

BRIEF DESCRIPTION OF THE SEVERAL VIEWS OF THE DRAWINGS

The accompanying diagrams described below are illustrations of one or more specific embodiments of the principles in the following description and are part of the specification. These illustrated embodiments are included with the intention of providing further clarification of the invention and do not limit the scope of the claims.

Figure 1:
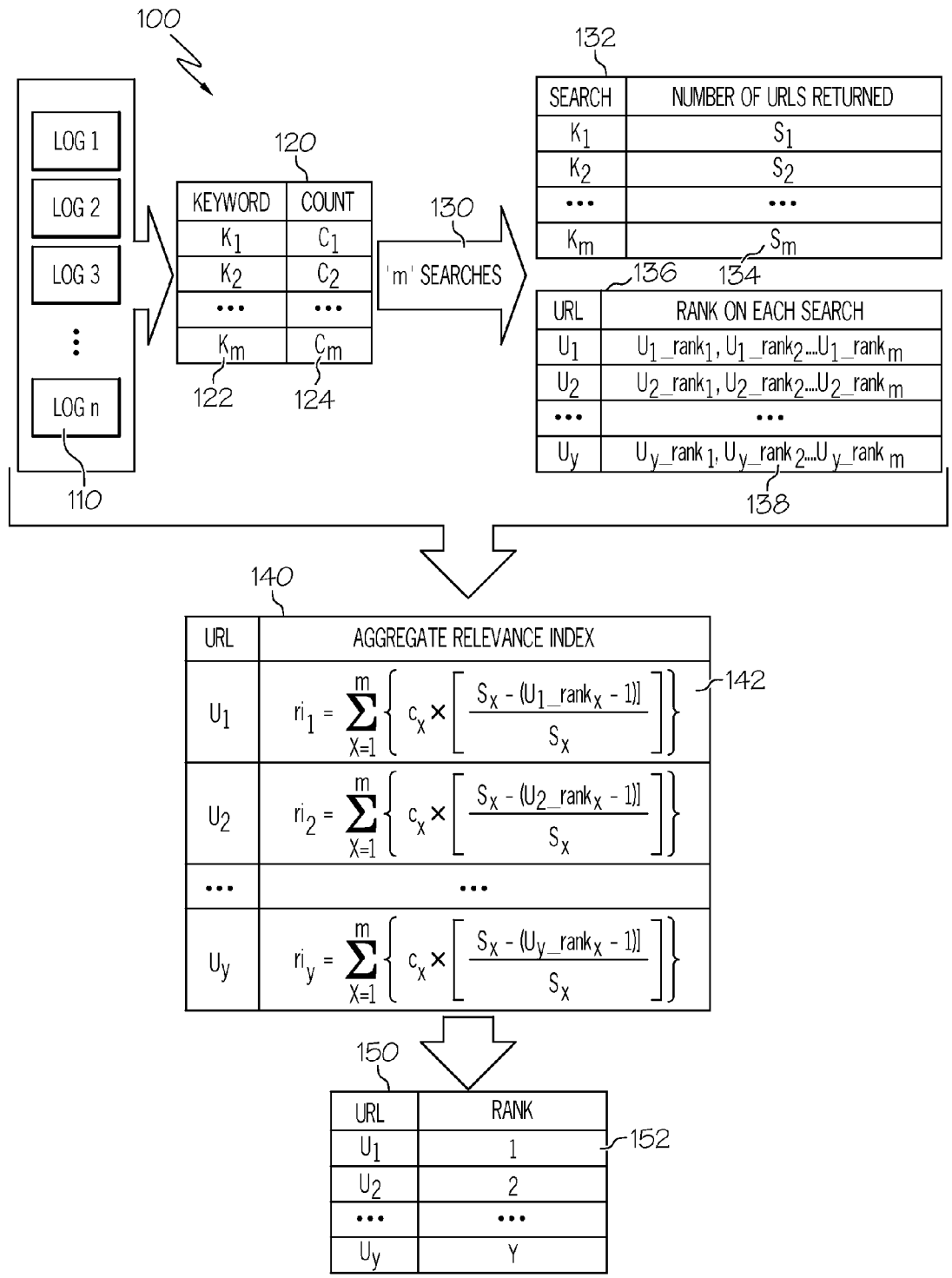
FIG. 1 is an illustrative diagram which depicts one exemplary system for extracting and utilizing information from log and trace files to produce a globally ranked list of URL documents that are relevant to a given technical issue, according to principles described herein.

The drawings are only intended to clarify the function of the invention in light of one particular example. They are not intended to represent any particular method for implementing the invention or any particular way in which data should be stored or organized while it is being processed or in between stages of processing. The drawings are only meant to illustrate one or more particular examples of the invention and therefore should not be considered as limiting the scope of the invention.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention will now be described in detail with reference to one or more diagrams. The description that follows uses one particular embodiment of the invention as an example in order to explain various details of the invention. The example used is only one particular embodiment of the invention and is not intended to limit the scope of the invention. It will be apparent to one skilled in the art that the present system, apparatus and methods of the invention could be implemented without specific details described below. Any particular feature, structure or characteristic described in connection of the embodiment or example is not necessarily included in other embodiments. Various instances of the term "embodiment" or similar terms do not necessarily all refer to the same embodiment.

In the following description of the invention, post-mortem problem isolation is used as an example of one particular embodiment of the invention. The invention is not intended to be used exclusively for post-mortem problem isolation and could be used in any number of situations where multiple related searches produce common URL results.

Unless otherwise defined all terms used herein, including technical and scientific terms have the same meaning as is commonly understood by one of ordinary skill in the art to which this invention belongs. Other terms that might be found in a commonly used dictionary are to be interpreted as having the same meaning as is consistent with the context in which they are used. They should not be interpreted in an idealized or overly formal sense unless expressly defined as such herein.

For ease of explanation, the following terms have been defined as they will be used in the specification and claims.

Keyword—A "keyword" is any informational element that has special or identifying significance. As used herein, a "keyword" may be any word, series of words, a number, or code element that helps to identify or index an associated concept or document. It does not have to be unique to a specific problem or any particular log/trace file.

Unique Message Identifier—A "unique message identifier" is a keyword that has been deliberately designed by programmers to uniquely identify a message produced in a log/trace file etc.

Knowledge Bases—A "knowledge base" is any knowledge resource available to the system performing a search. By way of example and not limitation, a "knowledge base" could reside on internal or external server(s) and be accessed by a variety of means including the Internet, an Intranet, or other communication network.

Customers and internal personnel who use software applications, computer hardware, and communication networks can experience technical problems that can be difficult to resolve alone. In many instances, support specialists are available through the vendor of the software or hardware product to resolve these technical issues. To analyze a technical issue, the support specialists need information contained within log files generated by the computer system. A log file is a record of actions that occurred within a particular program or hardware system. Typically a log file is a text file consisting of timestamp, status, action descriptions, and error messages that detail the operational history of a given piece of software/hardware. Dozens or even hundreds of log files can be associated with a particular technical issue, with a typical log file for a file server having 20 Megabytes of information.

Identifying and analyzing key data contained in the log files can be a laborious and time-consuming process. A typical scenario, the log files associated with the technical issue are imported from the customer machine to a local machine for analysis. Considerable time can be spent setting up the problem-solving environment, organizing the log files, and accessing the log files using a log record browser or other software tools. The log files contain voluminous detail about events that may not be directly related to the technical problem and can be ignored. The support specialists must winnow through the log files to identify key information that describes the symptoms or actions associated with the technical issue. By way of example and not limitation, support specialists could identify a particular command that was used by a malicious software application to mask its presence or erase evidence of its actions. This command, when placed in a particular context, could represent key information in identifying and solving technical issues relating to the malicious software.

Software tools can be used by support specialists to winnow through the log data to uncover key information about the technical issue. These software tools typically require that the specialist create a pattern or symptom definition in a specialized rule format that is specific to each software tool. The rules are then compared to various databases in an attempt to identify the underlying technical problem and find a solution to that problem. Many of these software tools do not rank the recommendations or matches that are generated. Instead the tool relies on the support specialist to manually refine the importance of each rule according to the problem being solved. Often when processing dozens of log files, a support specialist may receive hundreds of recommendations, many of which are repeated. Additionally, these tools do not consider the analyzed data as a whole. The current state-of-the-art software tools compare all the rules or keywords against all the database documents and show all matches. Not only is the relevance of the matches lost but relationships between the rules or keywords can be lost in this process. For instance, showing the support specialist that a match between a keyword "M1" and a file "F1" and a match with a keyword "M2" and a file "F2" may fail to communicate that solutions "M1" and "M2" are mutually exclusive. A better solution "M3" may only be indicated when the information in files "F1" and "F2" are combined.

In many instances, solutions to problems that have been previously solved are contained in technotes. Technotes are short technical articles that briefly cover a single technical problem and provide detailed solution on how to fix that problem. These technotes are typically stored and indexed in a knowledge database. However, experience has shown that it is difficult to match and convert information extracted from a log file analysis to solutions that are contained in a technote format. Technotes usually lack specific symptom definitions that are helpful in matching the technotes solutions with log file keywords/rules.

The present invention provides a method for extracting information from log files produced and matching the extracted information to solutions found by searching knowledge bases. The present invention decreases the time and effort it takes to analyze error logs and other files generated by an application. It also provides superior search results by merging a plurality of keyword searches to find the most relevant matches between the extracted data and potential solutions. The individual search results are ranked and displayed according their overall relevance to the technical issue.

FIG. 1 is an illustrative diagram showing one exemplary embodiment of a computer program product configured to extract and utilize information from log and trace files to produce a globally ranked list of URL documents that are relevant to a given technical issue. Log files (110) that may be relevant to the technical problem are gathered and organized such that their contents can be conveniently accessed. According to one exemplary embodiment, the computer program product first parses the log files (110) and then extracts keywords (122) from the parsed files. Alternatively, the computer program can directly search the files to extract the keywords.

Keywords (122) within the log files can be identified in a variety of ways. By way of example and not limitation, keywords (122) may be identified by their location or by a particular marker. Keywords (122) may be unique message identifiers inserted into the log file headers or entries. Alternatively, keywords may come from the top of execution, error, or exception stacks. For example, the keyword "com.ibm.websphere.management.AdminClientFactory.createAdminClient" may be a keyword that is taken from the top of an exception stack. The keywords may be extracted from code or messages written or produced by a variety of programming languages. Most applications and platforms have log files that are analogous to an error or exception stack, such as Unix GDB stacks or DB2 error stacks. Additionally, keywords may be identified by referencing a library that contains terms that may have particular relevance to technical issues in general or in a specific application. Algorithms may also be used that read text, eliminate common words, and then identify meaningful words that could be used as keywords.

In FIG. 1, the keywords (122) extracted from the log files (110) are identified by the variable "k" with a subscript numeral that represents the position of the keyword (122) within a keyword table (120). Additionally, the subscript numeral could represent the order in which the keywords were found and extracted from the log files (110). The number of times a keyword (122) was found across all log files is represented by a keyword count (124). For example, if the keyword "$k_1$" is found in the log files a total of eight times, the keyword count "$c_1$" for the keyword "$k_1$" would be eight. Similarly, if the keyword "$k_2$" is found with the log files a total of four times, the keyword count "$c_2$" for the keyword "$k_2$" would be four. After the keyword counts have been calculated, the keyword counts can be modified to optimize the search algorithm. For example, the keyword counts could be weighted by a statistical measure, such as a probability or distribution curve. In an alternative embodiment of the algorithm, the keyword count may be simplified to be the fixed multiplier "1" in order to avoid overshadowing the importance of less frequent keywords.

A search (130) for each keyword "$k_1$" through "$k_m$" is then performed within knowledge bases or other sources of information that may be relevant to the problem. The search may target specific knowledge bases that are known to contain technical information pertaining to the problem or may be more global in nature. According to one exemplary embodiment, each search returns a list of URLs ranked by relevance to the searched keyword "k". The search strategy and ranking of the returned URLs results are determined by whatever algorithm is used by the search engine and is not the object of this disclosure. The total number of URL results returned in each search are stored in a table (132). The total number of URL results are represented by the variable "S". The table (132) contains each of the keywords $k_1$ through $k_m$ in a first column and the total number of URLs returned in a second corresponding column.

The rank of a given URL "$U_y$" during the search for the keyword "$k_m$" is stored in a "URL search rank" table (136) with "$U_{y\_}\text{rank}_m$" indicating the position of the URL "$U_y$" with the total number of results "S" returned by a given search. The first position corresponds to a rank of "1", the second position corresponds to rank of "2", and so on.

Once all "m" searches are completed, the "URL search rank" table (136) contains a matrix of all URLs verses their rank on each search (138). The rank for URL "$U_y$" during search for keyword "$k_m$" is designated as $U_{y\_}\text{rank}_m$. According to one embodiment, if a URL is not returned during a search for a keyword, there is no ranking for it for that search. The proportional measure of the relevance of URL "$U_y$" within the search for keyword "$k_x$" can be calculated using the equation below:

$$\text{search rank index} = \frac{S_x - (U_{1\_}\text{rank}_x - 1)]}{S_x} \quad \text{(Eq. 1)}$$

Where:
search rank index=proportional measure of relevance of URL "$U_y$" within the search for keyword "$k_x$".
$S_x$=the total number of returned URLs in a search for keyword "$k_x$"
$U_y\_rank_x$=the numeric rank of the URL "$U_y$" within all URLs returned by the search for a keyword "$k_x$", where 1 is the first position and $S_x$ is the last position
x=subscript counter identifying search and search results corresponding to a specific keyword "$k_x$". The subscript "x" is incremented from one to "m" to index keywords "$k_1$" through "$k_m$"

According to one exemplary embodiment, the search rank index is a number between one and zero which reflects the proportional relevance of URL "$U_y$" with respect to all other URL results returned in a search for keyword "$k_x$". For example, a search rank index of 0.90 could indicate that a specific URL was more relevant than the majority of documents returned during a search. A search rank index of 0.10 could indicate that a specific URL was less relevant than the majority of documents returned in a given keyword search.

In the embodiment described by Eq. 1, the search rank index is calculated using the numeric rank of a specific URL "$U_y$" and the total number of search results "$S_x$" returned in a given keyword search. The numeric rank is a number that indicates the relative relevance the document represented by of "$U_y$" with respect to all other documents returned by the search. The numeric rank "$U_y\_rank_x$" minus one is then subtracted from the total number of results "$S_x$" and result is divided by total number of results "$S_x$" to find the proportional relevance of "$U_y$" with respect to all other URLs returned by a search for keyword "$k_x$".

Using the search rank index, a relevance index can be calculated using the Eq. 2.

$$\text{relevance index} = c_x \times \left[ \frac{S_x - (U_1\_rank_x - 1)}{S_x} \right] \quad \text{(Eq. 2)}$$

Where:
relevance index=a composite measure of relevance of the keyword "$k_x$" to log files as a whole and search rank index which measures the relevance of URL "$U_y$" within the search for keyword "$k_x$".
$c_x$=keyword count, a measure of the relevance of a keyword to the log files as a whole. The relevance can be measured in terms of appearances of the keyword inside the file or simply be the fixed multiplier "1" in order to avoid overshadowing the importance of less frequent keywords.

The relevance index is a composite measure of the relevance composed of two different holistic relevance measures. The first holistic relevance measure is the keyword count "$c_x$", which measures the importance of a keyword to the log files as a whole, and by extension, to the problem defined by group of log files. The search rank index is the second holistic relevance measure. The search rank index measures the importance of a URL within all the search results returned for a keyword.

The next step is to calculate the aggregate relevance index "$ri_y$" for each URL by summing the relevance index given in Eq. 2 over all searches "$k_1$ through $k_m$". The method of calculating the aggregate relevance index is given by Eq. 3, below.

$$ri_y = \sum_{x=1}^{m} \left\{ c_x \times \left[ \frac{S_x - (U_1\_rank_x - 1)}{S_x} \right] \right\} \quad \text{(Eq. 3)}$$

Where:
$ri_y$=the aggregate relevance index for the URL "$U_y$"
m=the total number of keywords/total number of searches Each proportional relevance result for "$U_y$" is multiplied by the keyword count for the search keyword and then summed over all searches to produce the aggregate relevance index "$ri_y$". The aggregate relevance index represents the importance of a particular search result to a group of log files as a single number. The aggregate relevance index captures the significance of searched keywords to the log files as a whole and the overall importance of a particular search result to all searched keywords.

Again using the example above, if URL "$U_1$" is returned as the most relevant document (url_rank$_n$=1) during a search for keyword "$k_1$" that returned four results (search_result_size$_m$=4) and the keyword count for "$k_1$" was 48, then the proportional relevance of "$U_1$" equals 48 for that search. For a search keyword "$k_2$" that returned ten results (n=10), URL "$U_1$" is returned as the fifth most relevant document (url_rank$_n$=5) and the keyword count for "$k_2$" was 32. The proportional relevance of "$U_1$" equals 19.2 for the second search. The proportional relevance results are summed over all searches to produce the aggregate relevance index "$ri_1$". If the URL "$U_1$" is returned only for searches "$k_1$" and "$k_2$", the aggregate relevance index "$ri_1$" is 67.2. Thus, the aggregate relevance index (140) is a measure of the relevance of a specific URL to the keywords as whole.

According to one alternative embodiment, the aggregate relevance index for a given page can be given by the following equation:

$$ri_y = \sum_{x=1}^{m} \left\{ c_x \times \left[ \frac{S_x - (U_y\_rank_x - 1)}{S_x} \right] \right\} \quad \text{(Eq. 4)}$$

Where:
$ri_y$=the aggregate relevance index
m=the total number of keywords
$S_x$=the total number of returned URLs in a search for keyword "m".
$U_y\_rank_x$=the rank of the URL "$U_y$" within all URLs returned by the search for keyword "$k_x$", where the rank is 1 if the URL was the first in the list, 2 if it was second, $S_x$ if it was the last and $S_x+1$ if it was not returned at all.
$c_x$=the keyword count, the total number of times a given keyword "$k_x$" was found within the collection of log files For example, if the log files contain the 48 instances of the keyword "$k_1$" and 32 instances of the keyword "$k_2$", the keyword count "$c_1$" for keyword "$k_1$" will be equal to "48" and keyword count "$c_2$" for "$k_2$" is equal to "32". An individual search is performed for keyword "$k_1$" and another search for keyword "$k_2$". The page "XYZ" shows up in rank "1" out 50 total results during the search of "$k_1$" and in rank "4" out 5 total results during the search for "$k_2$", its aggregate relevance index will be:

$$ri_{xyz} = \left\{48 \times \left[\frac{50-(1-1)}{50}\right] + 32 \times \left[\frac{5-(4-1)}{5}\right]\right\} = \quad \text{(Eq. 5)}$$

$$\{48 \times 1 + 32 \times 0.4\} = 48 + 12.8 = 60.8$$

The equations and examples above are merely an illustration of exemplary methods for calculating the global relevance of results of a plurality of searches. A variety of formulas and methods could be used to generate an aggregate relevance index or other factor that accounts for the relevance of a particular URL across multiple related searches.

The URLs are then displayed with the URL with the highest aggregate relevance index (142) being displayed at the top of the display result table (150) and URLs with lower aggregate relevance index (140) being listed correspondingly lower in the display result table (150). In general, documents with a higher aggregate relevance index are more likely to contain relevant information and solutions about a technical problem. By displaying the documents with the highest final rank at the top of the search results, the time and effort required for the support specialist to diagnose and remedy the technical problem can be significantly reduced.

Figure 2:
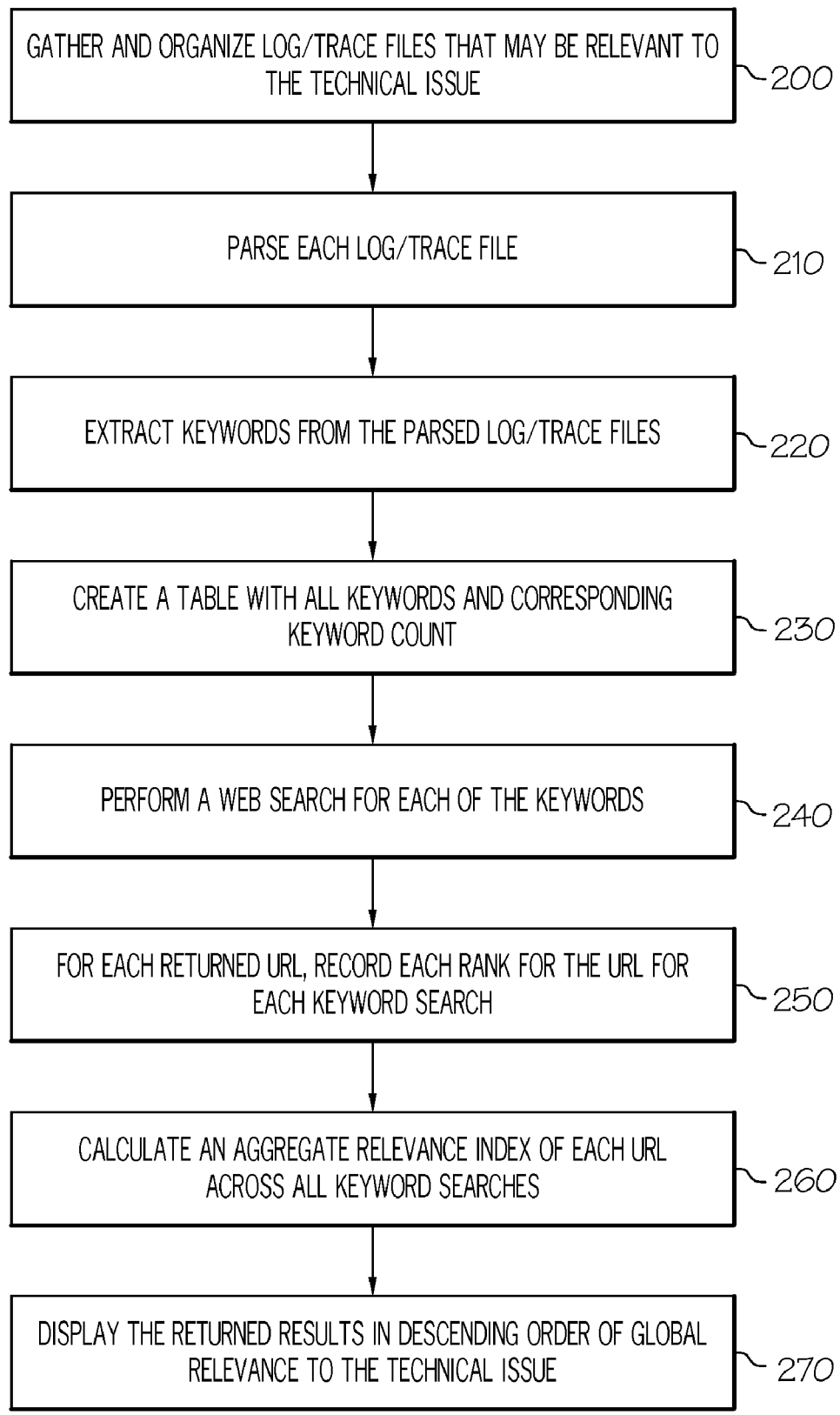
FIG. 2 is an illustrative flowchart which depicts one exemplary method for extracting and utilizing information from log and trace files to produce a globally ranked list of URL documents that are relevant to a given technical issue, according to principles described herein.

FIG. 2 illustrates one exemplary method for extracting and utilizing information from log and trace files to produce a globally ranked list of URL documents that are relevant to a given technical issue. In a first step, log and trace files that may be relevant to the technical issue are gathered/organized in a way that makes them accessible to the support specialist and any software tools that the support specialist may use (step 200). Each log trace file is then parsed (step 210). According to one exemplary embodiment, the parsing operation transforms the data contained within the log or trace files into a data structure, usually a tree, which is suitable for later processing and captures the implied hierarchy of input data.

Keywords are then extracted from the parsed data (step 220). A table is created that contains all the keywords and the corresponding keyword count (step 230). A search is then performed for each of the keywords (step 240). According to one exemplary embodiment, the search is specifically directed to knowledge bases which are known to contain technical information that is generally relevant to the area or field in which the technical problem arises. The rank of each returned URL is recorded for each keyword search. (step 250). For each returned URL, an aggregate relevance index for each URL is calculated by summing the product of the relevance index for a given URL across all searches (step 260). The aggregate relevance index is then used to determine the position of the URL in the final recommendation list, using a descending sorting order (step 270).

In sum, by cross comparing extracted keywords from the log files against searches of the public technotes, the results can be a ranked according to the global importance of the document to the technical issue in question. Documents that are returned more frequently, contain keywords with higher keyword counts, and are returned with high proportional relevance are scored higher than other documents. This technique leverages the problem-solving data contained in a technotes while considering the entirety of the log entries associated with the problem, thus allowing the results to be displayed according to their overall relevance. By creating a log analysis tool that ranks recommendations according to global relevance, the time and effort required to identify and solve problems based on postmortem collected data is reduced.

The preceding description is presented only as an example of one particular embodiment of the invention in order to explain the principles in detail. It is not intended to be an exhaustive or to limit the invention to the details disclosed. For example, the individual steps described need not happen in consecutively. Searches on the keywords could be performed while remaining keywords are still being extracted. By way of example and not limitation, rankings could be calculated by some other formula.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product for problem isolation through a weighted search of knowledge bases, the computer program product comprised of:
  a computer usable storage medium having computer usable program code embodied therewith, the computer usable program code comprising:

computer useable program code configured to perform multiple searches of said knowledge bases using keywords extracted from records, said records being related to a technical problem within a computer system, said keywords being used to identify pertinent documents contained within said knowledge databases, each of said pertinent documents containing a subset of said keywords;

computer useable program code configured to generate an aggregate relevance index associated with each of said pertinent documents, said aggregate relevance index being a composite of a keyword count which captures significance of searched keywords to said records as a whole and a search rank index which captures overall relevance of each of said pertinent documents over all searches for said searched key words; said search rank index comprising a ratio which includes a search rank of a said pertinent document among all documents returned in a given search and a total number of documents returned in said given search; wherein said aggregate relevance index comprises a sum of the search rank index for a said pertinent document across each search for each of said keywords, said aggregate relevance index being equal to the product of said search rank index and said keyword count summed over all keyword searches.

2. The computer program product of claim 1, wherein each of said pertinent documents are identified by a uniform resource locator or a file path.

3. The computer program product of claim 1, wherein the search rank of each pertinent document during each search and total number of search results are recorded, said search rank and said total number of search results for each pertinent document being incorporated into an aggregate relevance index for each pertinent document.

4. The computer program product of claim 1, wherein said pertinent documents are displayed in descending order of said aggregate relevance index.

5. The computer program product of claim 1, in which said search rank index comprises:

$$\text{search rank index} = \frac{S_x - (U_{1\_}rank_x - 1)]}{S_x}$$

wherein said search rank index is a proportional measure of relevance of URL $U_y$ within a search for keyword $k_x$; $S_x$ equals a total number of returned URLs in said search for keyword $k_x$; $U_{y\_}rank_x$ equals a numeric rank of URL $U_y$ within all URLs returned by said search for a keyword $k_x$, where 1 is a first position and $S_x$ is a last position; and x is a subscript counter identifying search and search results corresponding to said keyword $k_x$; wherein said subscript x is incremented from one to m to index keywords $k_1$ through $k_m$.

6. The computer program product of claim 5, in which said aggregate relevance index further comprises a relevance index, said relevance index comprising a composite measure of relevance of a keyword to said records as a whole and said search rank index, said relevance index being defined by:

$$\text{relevance index} = c_x \times \left[\frac{S_x - (U_{1\_}rank_x - 1)]}{S_x}\right]$$

wherein $c_x$ is a keyword count which measures relevance of a keyword $k_x$ to submitted log files as a whole.

7. The computer program product of claim 6, in which said aggregate relevance index further comprises an aggregate relevance index value for each URL, said aggregate relevance index value comprising a sum of said relevance index over all searches for keywords $k_1$ through $k_m$; said aggregate relevance index value for each URL being defined by:

$$ri_y = \sum_{x=1}^{m} \left\{ c_x \times \left[\frac{S_x - (U_{1\_}rank_x - 1)]}{S_x}\right] \right\}$$

wherein $ri_y$ is said aggregate relevance index for said URL $U_y$ and m is a total number of keyword searches.

8. The computer program product of claim 1, in which said aggregate relevance index comprises a measure of relevance of a particular URL across multiple related searches; each URL returned by said multiple related searches being assigned an aggregate relevance index value, wherein at least a portion of URLs returned by said multiple related searches are displayed to a user by descending aggregate relevance index value.

9. A method for problem isolation through a weighted search of knowledge bases comprising:

obtaining keywords, said keywords being extracted from records, said records being related to a technical problem within a computer system;

searching said knowledge bases using said keywords to identify pertinent documents contained within said knowledge databases, each of said pertinent documents containing a subset of said keywords;

generating a global rank associated with each of said pertinent documents, said global rank comprising a measure of relevance of each of said pertinent documents across all keyword searches and a measure of relevance of each of said keywords to said records as a whole, the global rank comprising an aggregate relevance index generated by:

summing a rank for each of said pertinent documents across each search for each of said keywords to produce a search rank index, the search rank index comprising a ratio which includes a search rank of a said pertinent document among all documents returned in a given search and a total number of documents returned in said given search, the search rank capturing the relevance of each of said pertinent documents across all keyword searches;

multiplying said search rank index by a keyword count to produce a weighted search rank, the keyword count capturing relevance of each of said keywords to said records as a whole; and summing said weighted search rank index over all keyword searches to produce the aggregate relevance index.

10. The method of claim 9, wherein said measure of relevance of each of said keywords to said records as a whole comprises generating a keyword count associated with each of said keywords, said keyword count being equal to a total number of incidences of a said keyword within said records; and said measure of relevance of each of said pertinent documents across all keyword searches comprises forming a search rank index by measuring a rank of a said pertinent document within all other documents returned by a search engine for a said keyword.

11. The method of claim 9, further comprising displaying said pertinent documents in descending order of said aggregate relevance index.

* * * * *